United States Patent
Lai et al.

(10) Patent No.: US 11,327,299 B2
(45) Date of Patent: May 10, 2022

(54) LIGHT SHIELDING SHEET

(71) Applicant: PLATINUM OPTICS TECHNOLOGY INC., Taoyuan (TW)

(72) Inventors: Yuan-Chang Lai, Taoyuan (TW); Guan-Cheng Lin, Taoyuan (TW); Chia-Fu Liu, Taoyuan (TW)

(73) Assignee: PLATINUM OPTICS TECHNOLOGY INC., Taoyuan (TW)

( * ) Notice: Subject to any disclaimer, the term of this patent is extended or adjusted under 35 U.S.C. 154(b) by 208 days.

(21) Appl. No.: 16/529,916

(22) Filed: Aug. 2, 2019

(65) Prior Publication Data

US 2020/0132986 A1 Apr. 30, 2020

(30) Foreign Application Priority Data

Oct. 31, 2018 (TW) ................. 107138611

(51) Int. Cl.
*G02B 1/115* (2015.01)
*G02B 27/00* (2006.01)
*G02B 5/00* (2006.01)

(52) U.S. Cl.
CPC .......... *G02B 27/0018* (2013.01); *G02B 1/115* (2013.01); *G02B 5/003* (2013.01)

(58) Field of Classification Search
CPC .... G02B 27/0018; G02B 1/115; G02B 5/003; G02B 27/00; G02B 5/00
See application file for complete search history.

(56) References Cited

U.S. PATENT DOCUMENTS

| | | | |
|---|---|---|---|
| 2006/0018041 A1* | 1/2006 | Hirata | G02B 27/0018 359/738 |
| 2006/0291076 A1* | 12/2006 | Watanabe | G02B 7/025 359/811 |
| 2010/0118404 A1* | 5/2010 | Endoh | G02B 1/118 359/569 |
| 2010/0171908 A1* | 7/2010 | Yoshihara | G02B 1/111 349/96 |
| 2010/0208350 A1* | 8/2010 | Yoshihara | G02B 1/116 359/585 |
| 2010/0227085 A1* | 9/2010 | Yoshihara | G02B 1/118 428/1.6 |
| 2011/0267684 A1* | 11/2011 | Pei | G02B 5/005 359/359 |
| 2013/0021681 A1* | 1/2013 | Ho | G02B 5/005 359/740 |

(Continued)

*Primary Examiner* — Balram T Parbadia
(74) *Attorney, Agent, or Firm* — Amin, Turocy & Watson, LLP

(57) ABSTRACT

A light shielding sheet for a lens is provided, including: a metal substrate, including: a first surface; a second surface opposing the first surface; a first through light hole being in communication with the first surface and having hole radiuses gradually decreasing in a direction from the first surface to the second surface, a ratio of a depth of the first through light hole to a difference between two of the hole radiuses at two ends of the first through light hole being less than or equal to 0.5; and a second through light hole being in communication with the first through light hole and the second surface; and a light extinction film covering the first surface, the second surface, a hole wall of the first through light hole and a portion of a hole wall of the second through light hole of the metal substrate.

16 Claims, 5 Drawing Sheets

(56) References Cited

U.S. PATENT DOCUMENTS

| | | | | |
|---|---|---|---|---|
| 2013/0045378 A1* | 2/2013 | Inoue | ............... | G02B 1/116 |
| | | | | 428/332 |
| 2015/0055222 A1* | 2/2015 | Tamada | ............ | G02B 5/286 |
| | | | | 359/581 |
| 2015/0177419 A1* | 6/2015 | Chu | ................ | G02B 1/11 |
| | | | | 359/586 |
| 2015/0185366 A1* | 7/2015 | Bone | .............. | G02B 5/003 |
| | | | | 359/580 |
| 2015/0253532 A1* | 9/2015 | Lin | ................ | G02B 7/022 |
| | | | | 359/601 |
| 2016/0349504 A1* | 12/2016 | Kim | ................ | G02B 5/003 |
| 2017/0052293 A1* | 2/2017 | Cangemi | ........... | G02B 7/025 |
| 2018/0134006 A1* | 5/2018 | Lin | ................ | B32B 27/00 |
| 2018/0138351 A1* | 5/2018 | Hsu | ................ | H01L 33/44 |
| 2019/0107649 A1* | 4/2019 | Ikegami | ........... | G02B 5/22 |
| 2019/0227202 A1* | 7/2019 | Nagahama | ........ | G03B 11/00 |

\* cited by examiner

LIGHT SHIELDING SHEET

CROSS-REFERENCE TO RELATED APPLICATIONS

This application claims priority to Taiwanese Application Serial No. 107138611, filed on Oct. 31, 2018. The entirety of the application is hereby incorporated by reference herein and made a part of this specification.

BACKGROUND

1. Technical Field

The present disclosure relates to light shielding sheets, and, more particularly, to a light shielding sheet for a lens.

2. Description of the Prior Art

In recent years, with the rapid development of portable electronic devices, cameras, mobile phones or tablets have emphasized the camera function. The optical lens module is configured to receive incident light from a target object and direct the incident light through a lens set including a plurality of optical lenses. The lens set is optimized to eliminate various aberrations, resulting in the best quality of the final image of the image sensing element.

Ideally, the incident light should contain only the surface light of the subject. However, due to the surrounding environment, the light incident on the optical lens module also contains the stray light from the non-target object. In order to avoid such unnecessary stray light affecting the image quality, a light shielding sheet is generally disposed at the front end of the optical lens module. The light shielding sheet absorbs the stray light incident near the edge of the lens, and thus reduces flares and ghosts formed by the stray light interfering with each other after multiple reflections in the optical lens module.

Due to the convenience of production, the current light shielding sheets are mostly made of a plastic material, and black ink is coated on the surface of the light shielding sheet as a light absorbing material. However, such a structure still does not completely block the light. In addition, since the light through hole of the light shielding sheet has right-angled edges, it cannot effectively block the harmful light incident obliquely.

Therefore, how to improve the light shielding effect of a light shielding sheet is becoming an urgent issue in the art.

SUMMARY

In view of the problems of the prior art, the present disclosure provides a light shielding sheet for a lens, comprising: a metal substrate, including: a first surface; a second surface opposing the first surface; a first through light hole being in communication with the first surface and having hole radiuses gradually decreasing in a direction from the first surface to the second surface, a ratio of a depth of the first through light hole to a difference between two of the hole radiuses at two ends of the first through light hole being less than or equal to 0.5; and a second through light hole being in communication with the first through light hole and the second surface; and a light extinction film covering the first surface, the second surface, a hole wall of the first through light hole and a portion of a hole wall of the second through light hole of the metal substrate.

In an embodiment, the metal substrate is made of one selected from the group consisting of iron, copper, aluminum, silver and gold.

In an embodiment, an exposed portion of the hole wall of the second through light hole exposed from the light extinction film has a width less than 5 μm in a direction extending from an axis of the second through light hole. In another embodiment, the width of the exposed portion of the hole wall of the second through light hole in the direction extending from the axis of the second through light hole is less than 3 μm.

In an embodiment, the hole wall of the first through hole is an annular inclined plane. In another embodiment, the hole wall of the first through hole is an annular concave plane.

In an embodiment, the light extinction film includes an anti-reflection film and a light absorption film disposed between the anti-reflection film and the metal substrate. In another embodiment, the light absorption film and the anti-reflection film are made of at least one selected from the group consisting of metal, metal nitride, metal hydrogen, metal oxide, a semiconductor element, semiconductor element nitride, semiconductor element hydrogen and semiconductor element hydroxide.

In an embodiment, each of the light absorption film and the anti-reflection film has a plurality of layers having different refractive indexes and stacked on one another in a high refractive index-low refractive index interaction.

In an embodiment, the metal is Ti or Cr.

In an embodiment, the light absorption film includes a Ti layer and has a refractive index of 1.7 to 2.5 for a wavelength of 400 to 700 nm and an absorption index less than 3.6.

In an embodiment, the semiconductor element is Si or Ge.

In an embodiment, each of the light absorption film and the anti-reflection film includes a Ti layer and a Si: H layer that has a total thickness less than a half of a total thickness of the Ti layer.

In an embodiment, each of the light absorption film and the anti-reflection film includes a $SiO_2$ layer and a Si: H layer that has a total thickness less than a half of a total thickness of the $SiO_2$ layer.

In an embodiment, the anti-reflection film includes a Si: H layer, a $SiO_2$ layer and a Ti layer having different refractive indexes and stacked on one another in a high refractive index-low refractive index interaction. In another embodiment, the Si: H layer has a refractive index of 4.7 to 5.2 for a wavelength of 400 to 700 nm and an absorption index less than 2, the $SiO_2$ layer has a refractive index of 1.46 to 1.51 and an absorption index less than 2, and the Ti layer has a refractive index of 1.85 to 4.1 and an absorption index less than 3.4.

In an embodiment, the light extinction film has an average reflective index less than 0.15% for a wavelength of 400 to 700 nm.

In an embodiment, the light extinction film total thickness less than 500 nm.

In an embodiment, the light extinction film has a chromaticity coordinate, in which $0<L^*<1.4$, $|a^*|<1$, and $-2.5<b^*<0$.

In the light shielding sheet according to the present disclosure, the light extinction film covers the first and second surfaces of the metal substrate, and the hole radiuses gradually decrease in a direction from the first surface to the second surface. Therefore, the light absorption is increased, the reflective index is reduced, and the problem of the prior art that the light shielding sheet cannot effectively shield ambient stray light is solved.

BRIEF DESCRIPTION OF THE DRAWINGS

The disclosure can be more fully understood by reading the following detailed description of the embodiments, with reference made to the accompanying drawings, wherein.

DETAILED DESCRIPTION

The following illustrative embodiments are provided to illustrate the disclosure of the present disclosure, these and other advantages and effects can be apparently understood by those in the art after reading the disclosure of this specification. The present disclosure can also be performed or applied by other different embodiments. The details of the specification may be on the basis of different points and applications, and numerous modifications and variations can be devised without departing from the spirit of the present disclosure.

The terminology used herein is for the purpose of describing particular devices and methods only and is not intended to be limiting of this disclosure. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof.

Figure 1:
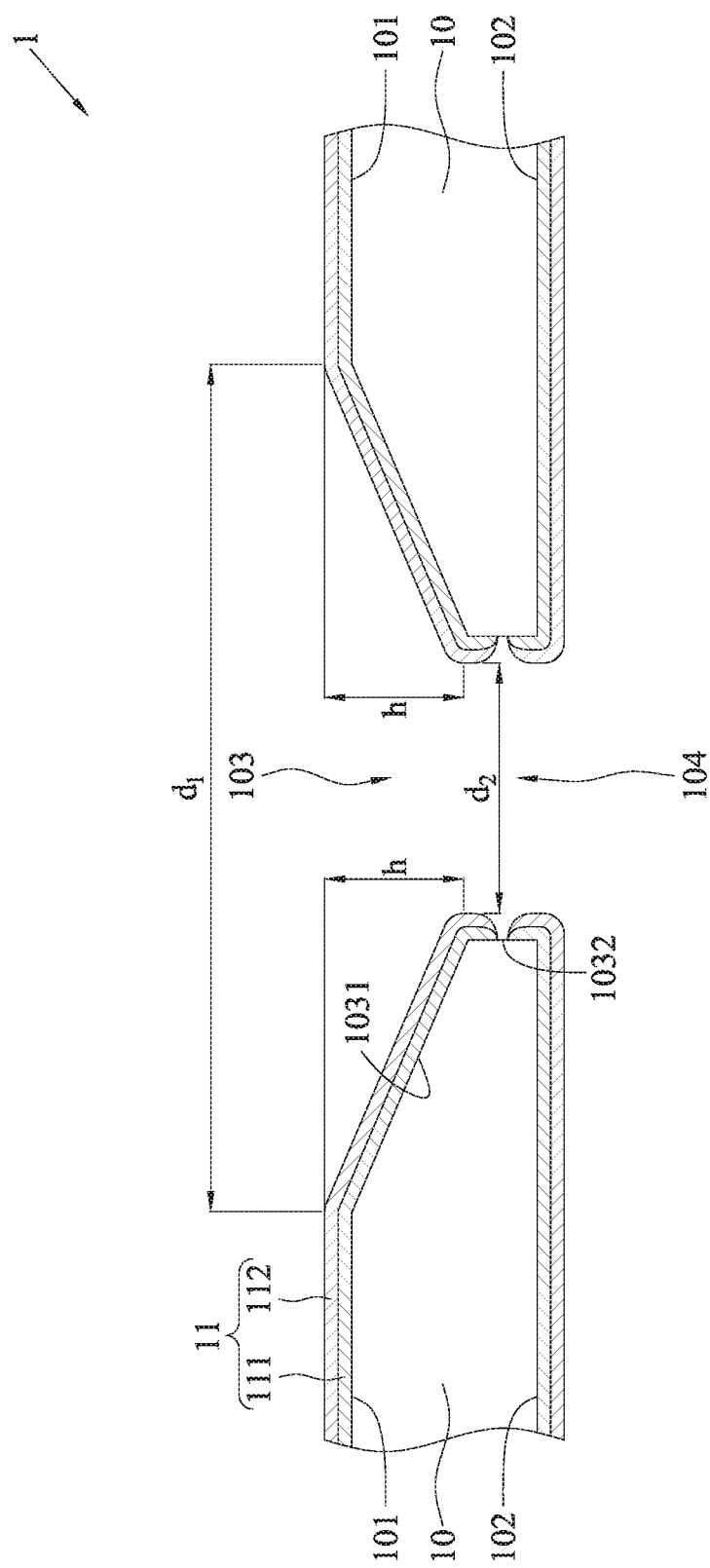
FIG. 1 is a schematic diagram of a light shielding sheet according to the present disclosure.

FIG. 1 is a schematic diagram of a light shielding sheet 1 according to the present disclosure.

The light shielding sheet 1 has a metal substrate 10. The metal substrate 10 includes a first surface 101, a second surface 102 opposing the first surface 101, and a first through light hole 103 and a second through light hole 104 disposed between the first surface 101 and the second surface 102. The first through light hole 103 has a hole wall 1031 in communication with a hole wall 1032 of the second through light hole 104. The first through light hole 103 has hole radiuses gradually decreasing in a direction from the first surface 101 to the second surface 102. In other words, a hole radius $d_1$ of the first surface 101 is greater than a hole radius $d_2$ of the second surface 102. A distance from the first surface 101 to a connection point of the first through light hole 103 and the second through light hole 104 is a depth h of the first through light hole 103. A ratio of the depth h of the first through light hole 103 to a difference of two of the hole radiuses $(d_1-d_2)$ at two ends of the first through light hole 103, is less than or equal to 0.5.

In an embodiment, the metal substrate 10 is made of at least one selected from the group consisting of iron, copper, aluminum, silver and gold. In another embodiment, the first through light hole 103 and the second through light hole 104 can be formed by etching, laser cutting etc. In yet another embodiment, the hole wall 1031 of the first through light hole 103 is an annular inclined plane. In still another embodiment, the hole wall 1031 of the first through light hole 103 is an annular concave plane.

The light shielding sheet 1 further comprises a light extinction film 11. The light extinction film 11 can be deposited on a surface of the metal substrate 10 by deposition, such as evaporation, sputtering, electroplating etc. In an embodiment, the metal substrate 10 is fixed to an evaporation deposition machine, a material of the light extinction film 11 is then deposited on one surface of the metal substrate 10, the metal substrate 10 is flipped over, and the material is deposited on the other surface of the metal substrate 10. Therefore, the light extinction film 11 can cover the first surface 101, the second surface 102, the hole wall 1031 of the first through light hole 103 and a portion of the hole wall 1032 of the second through light hole 104. In an embodiment, an exposed portion of the hole wall 1032 exposed from the light extinction film 11 has a width less than 5 μm in a direction extending from an axis of the second through light hole 104. In another embodiment, the width is less than 3 μm.

As shown in FIG. 1, the light extinction film 11 comprises an anti-reflection film 112 and a light absorption film 111 disposed between the anti-reflection film 112 and the metal substrate 10. In an embodiment, the light absorption film 111 is formed on a surface of the metal substrate 10 and in direct contact with the metal substrate 10. In another embodiment, another film is formed on the metal substrate 10 first, and then the light absorption film 111 is formed on the another film and is thus in no contact with the metal substrate 10. Similarly, the anti-reflection film 112 can be in direct contact with the light absorption film 111, or be in no contact with the light absorption film 111 as another film is formed between the light absorption film 111 and the anti-reflection film 112. In an embodiment, the anti-reflection film 112 acts as an outermost one of the light extinction film 11. In another embodiment, another film is formed on an outer surface of the anti-reflection film 112.

In an embodiment, the light absorption film 111 and the anti-reflection film 112 are made of at least one selected from the group consisting of metal, metal nitride, metal hydrogen, metal oxide, semiconductor element, semiconductor element nitride, semiconductor element hydrogen and semiconductor element hydroxide. In another embodiment, each of the light absorption film 111 and the anti-reflection film 112 has a plurality of layers that have different refractive indexes and are stacked on one another in a high refractive index-low refractive index interaction. In yet another embodiment, the light absorption film 111 and the anti-reflection film 112 are made of metal element Ti or Cr or its metal nitride, metal hydrogen or metal oxide. In still another embodiment, the light absorption film 111 and the anti-reflection film 112 are made of semiconductor element Si or Ge nitride, hydrogen or hydroxide.

In an embodiment, the film layers of the light absorption film 111 or the anti-reflection film 112 are made of specific metal element or semiconductor element. In another embodiment, the thickness and refractive index of a specific film layer of the light absorption film 111 or the anti-reflection film 112 can be adjusted, to obtain needed optical characteristics, such as reflective index and color.

Figure 2:
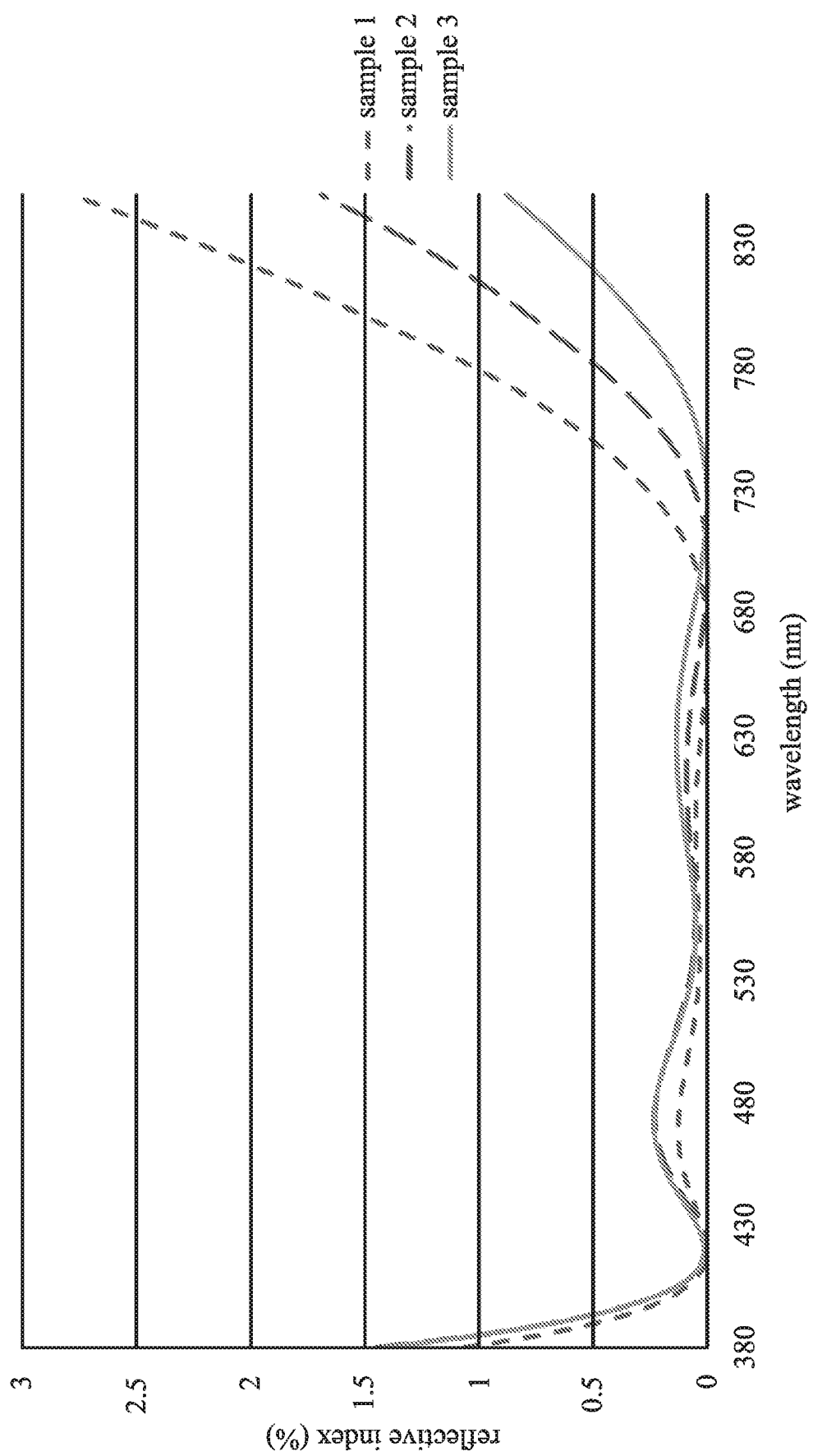
FIG. 2 is a curve diagram of reflective indexes of samples 1-3 according to the present disclosure.
Figure 3:
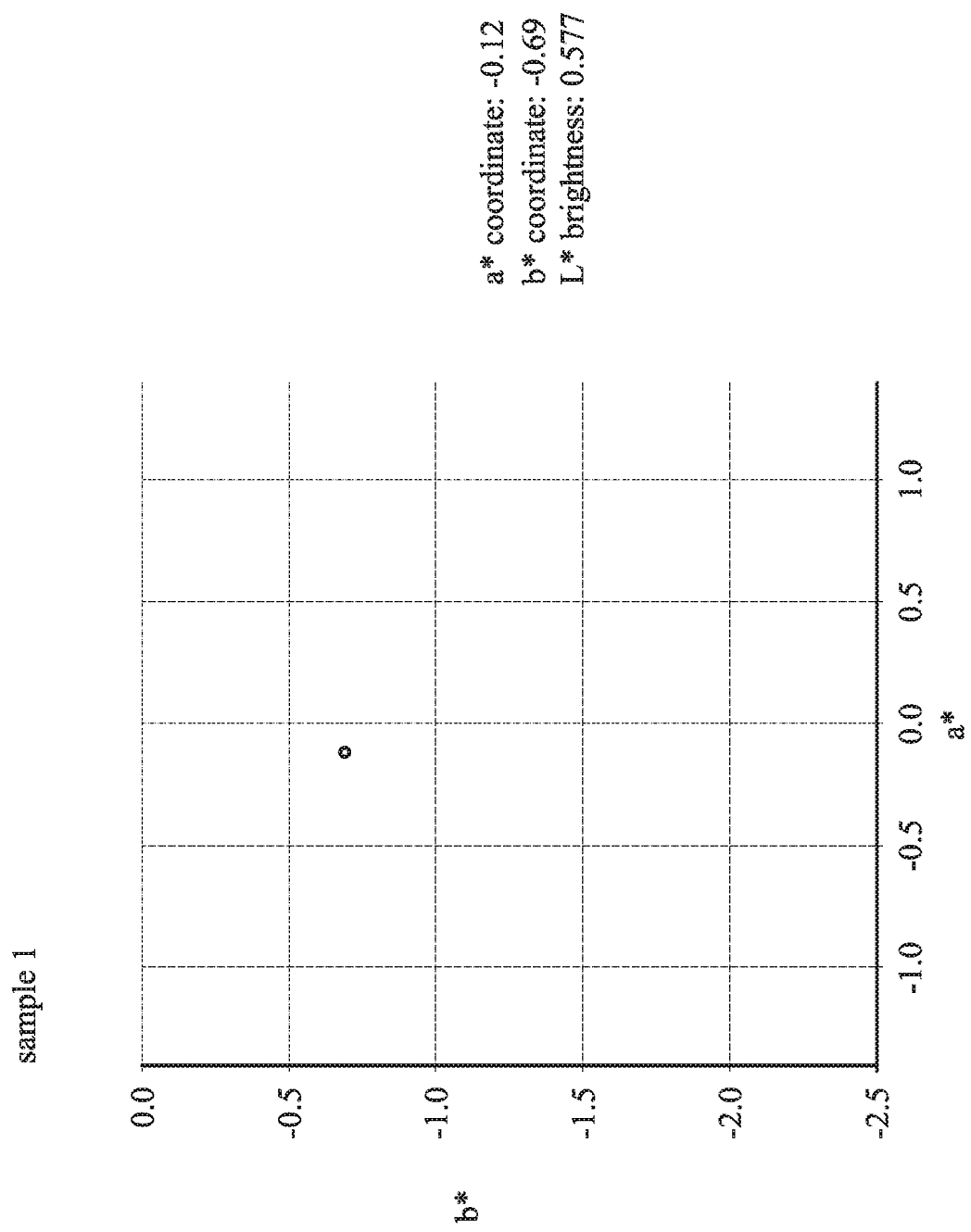
FIG. 3 is a chromaticity space diagram of the sample 1.
Figure 4:
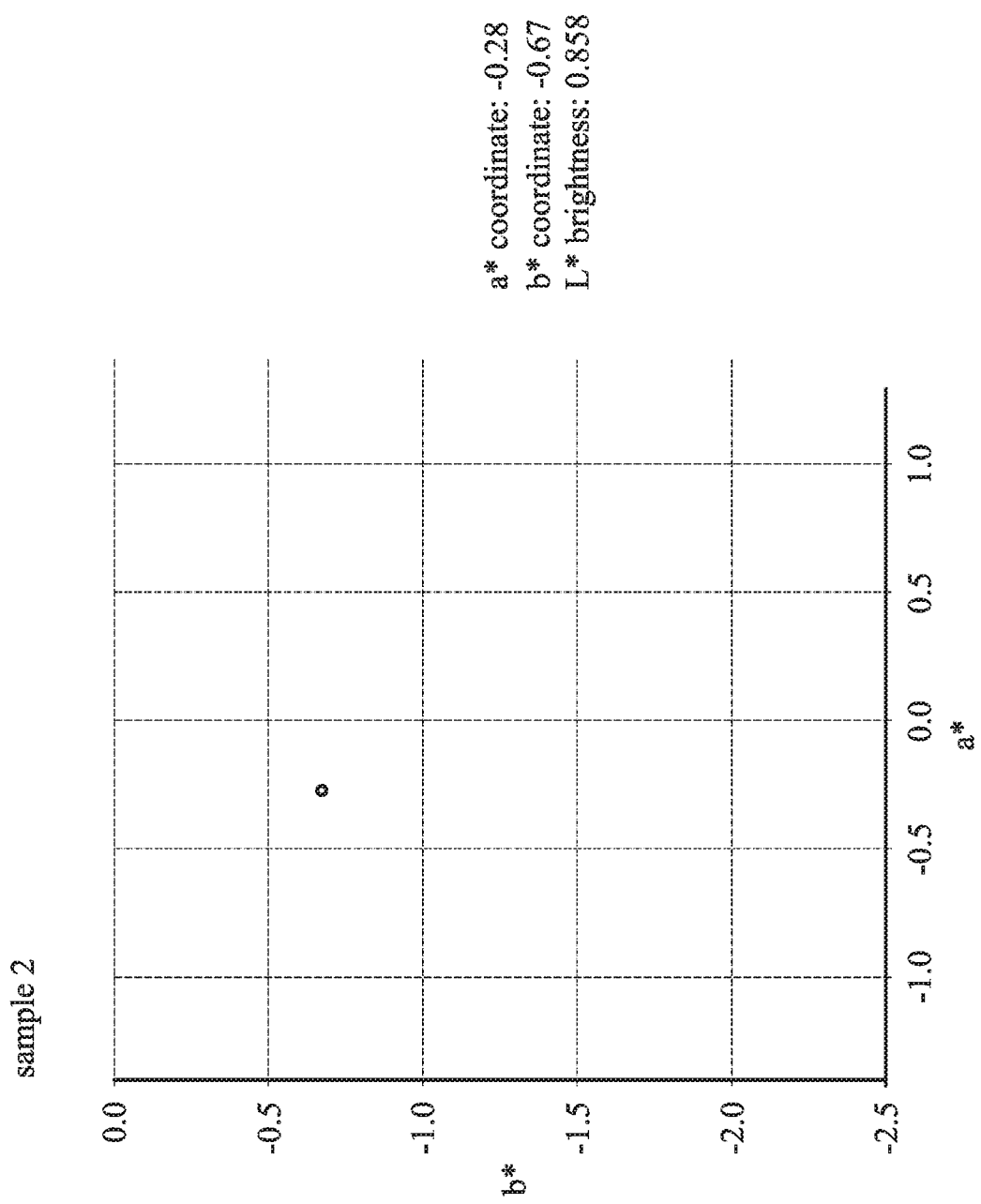
FIG. 4 is a chromaticity space diagram of the sample 2.
Figure 5:
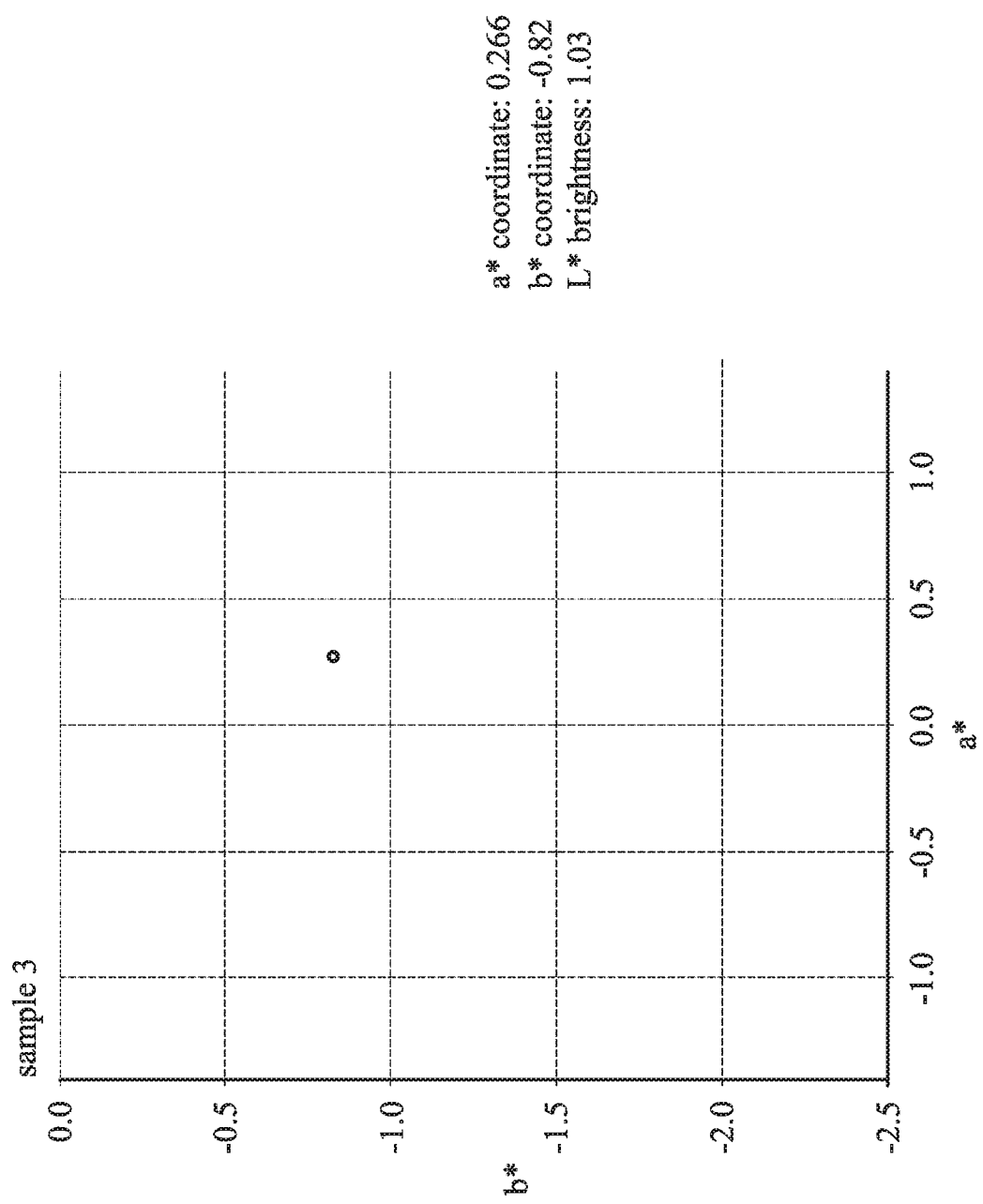
FIG. 5 is a chromaticity space diagram of the sample 3.

FIG. 2 is a curve diagram of reflective indexes of samples 1-3 according to the present disclosure. FIGS. 3-5 are chromaticity space diagrams of the samples 1-3, respectively.

Refer to FIGS. 2 and 3. In a first embodiment according to the present disclosure, each of the light absorption film 111 and the anti-reflection film 112 comprises a Ti layer having a total thickness of 175.21 nm, a $SiO_2$ layer having a total thickness of 150.56 nm, and a Si: H layer having a total thickness of 13 nm. In other words, a ratio of the total thickness of the Si: H layer to the total thickness of the Ti layer is 0.074, and a ratio of the total thickness of the Si: H layer to the total thickness of the SiO$_2$ layer is 0.086. The light extinction film 11 has an average reflective index of 0.0543% for a wavelength of 400 to 700 nm, and has a chromaticity coordinate, in which L*=0.577, la*l=0.12 and b*=−0.69.

Refer to FIGS. 2 and 4. In a second embodiment according to the present disclosure, each of the light absorption film 111 and the anti-reflection film 112 comprises a Ti layer having a total thickness of 116.3 nm, a SiO$_2$ layer having a total thickness of 96.61 nm, and a Si: H layer having a total thickness of 21.49 nm. In other words, a ratio of the total thickness of the Si: H layer to the total thickness of the Ti layer is 0.185, and a ratio of the total thickness of the Si: H layer to the total thickness of the SiO$_2$ layer is 0.222. The light extinction film 11 has an average reflective index of 0.107406% for a wavelength of 400 to 700 nm, and a chromaticity coordinate, in which L*=0.858, la*l=0.28 and b*=−0.67.

Refer to FIGS. 2 and 5. In a third embodiment according to the present disclosure, each of the light absorption film 111 and the anti-reflection film 112 comprises a Ti layer having a total thickness of 106.5 nm, a SiO$_2$ layer having a total thickness of 104.85 nm, and a Si: H layer having a total thickness of 48 nm. In other words, a ratio of the total thickness of the Si: H layer to the total thickness of the Ti layer is 0.451, and a ratio of the total thickness of the Si: H layer to the total thickness of the SiO$_2$ layer is 0.458. The light extinction film 11 has an average reflective index of 0.125981% for a wavelength of 400 to 700 nm, and a chromaticity coordinate, in which L*=1.03, la*l=0.266 and b*=−0.82.

According to the first to third embodiments of the present disclosure, the total thickness of the light extinction film 11 is less than 500 nm; and when a ratio of the total thickness of the Si: H layer to the total thickness of the Ti layer is less than 0.5 and a ratio of the total thickness of the Si: H layer to the total thickness of the SiO$_2$ layer is less than 0.5, the average reflective index of the light extinction film 11 is less than 0.15% for a wavelength of 400 to 700 nm, and 0<L*<1.4, la*l<1 and −2.5<b*<0 in the chromaticity coordinate.

In an embodiment, the light absorption film 111 comprises a Ti layer, the total thickness of the whole or a portion of the stacked layers of the light absorption film 111 can be adjusted, to obtain a refractive indexes of 1.7 to 2.5 and an absorption index less than 3.6 for a wavelength of 400 to 700 nm. In another embodiment, the anti-reflection film 112 comprises at least a Si: H layer, a SiO$_2$ layer and a Ti layer that have different refractive indexes and are stacked on one another in a high refractive index-low refractive index interaction. For a wavelength of 400 to 700 nm, the Si: H layer has a refractive indexes of 4.7 to 5.2 and an absorption index less than 2, the SiO$_2$ layer has a refractive index of 1.46 to 1.51 and an absorption index less than 2, and the Ti layer has a refractive index of 1.85 to 4.1 and an absorption index less than 3.4.

In the light shielding sheet according to the present disclosure, the light extinction film covers the first and second surfaces of the metal substrate, and the hole radiuses gradually decrease in a direction from the first surface to the second surface. Therefore, the light absorption is increased, the reflective index is reduced, and the problem of the prior art that the light shielding sheet cannot effectively shield ambient stray light is solved.

The foregoing descriptions of the detailed embodiments are only illustrated to disclose the features and functions of the present disclosure and not restrictive of the scope of the present disclosure. It should be understood to those in the art that all modifications and variations according to the spirit and principle in the disclosure of the present disclosure should fall within the scope of the appended claims.

What is claimed is:

1. A light shielding sheet for a lens, comprising:
 a metal substrate, including:
  a first surface;
  a second surface opposing the first surface;
  a first through light hole being in communication with the first surface and having hole radiuses gradually decreasing in a direction from the first surface to the second surface, a ratio of a depth of the first through light hole to a difference between two of the hole radiuses at two ends of the first through light hole being less than or equal to 0.5; and
  a second through light hole being in communication with the first through light hole and the second surface; and
 a light extinction film covering the first surface, the second surface, a hole wall of the first through light hole and a portion of a hole wall of the second through light hole of the metal substrate, wherein the light extinction film includes an anti-reflection film and a light absorption film disposed between the anti-reflection film and the metal substrate, wherein the light absorption film is made of at least one selected from the group consisting of metal, metal nitride, metal hydrogen, metal oxide, a semiconductor element, semiconductor element nitride, semiconductor element hydrogen and semiconductor element hydroxide, wherein the anti-reflection film includes a Si: H layer, a SiO$_2$ layer and a Ti layer having different refractive indexes and stacked on one another in a high refractive index-low refractive index interaction.

2. The light shielding sheet of claim 1, wherein the hole wall of the first through hole is an annular inclined plane.

3. The light shielding sheet of claim 1, wherein the hole wall of the first through hole is an annular concave plane.

4. The light shielding sheet of claim 1, wherein the light absorption film has a plurality of layers having different refractive indexes and stacked on one another in a high refractive index-low refractive index interaction.

5. The light shielding sheet of claim 1, wherein the metal is Ti or Cr.

6. The light shielding sheet of claim 1, wherein the semiconductor element is Si or Ge.

7. The light shielding sheet of claim 1, wherein the light absorption film includes a Ti layer and the light absorption film has a refractive index of 1.7 to 2.5 for a wavelength of 400 to 700 nm and an absorption index less than 3.6.

8. The light shielding sheet of claim 1, wherein the Si: H layer has a refractive index of 4.7 to 5.2 for a wavelength of 400 nm to 700 nm and an absorption index less than 2, the SiO$_2$ layer has a refractive index of 1.46 to 1.51 and an absorption index less than 2, and the Ti layer has a refractive index of 1.85 to 4.1 and an absorption index less than 3.4.

9. The light shielding sheet of claim 1, wherein the light absorption film includes a Ti layer and a Si: H layer, and wherein the Si: H layer has a total thickness less than a half of a total thickness of the Ti layer.

10. The light shielding sheet of claim 1, wherein the light absorption film includes a SiO$_2$ layer and a Si: H layer, and wherein the Si: H layer has a total thickness less than a half of a total thickness of the SiO$_2$ layer.

11. The light shielding sheet of claim 1, wherein the light extinction film has an average reflective index less than 0.15% for a wavelength of 400 nm to 700 nm.

12. The light shielding sheet of claim 1, wherein the light extinction film has a total thickness less than 500 nm.

13. The light shielding sheet of claim 1, wherein an exposed portion of the hole wall of the second through light hole exposed from the light extinction film has a width less than 5 μm in a direction extending from an axis of the second through light hole.

14. The light shielding sheet of claim 13, wherein the width of the exposed portion of the hole wall of the second through light hole in the direction extending from the axis of the second through light hole is less than 3 μm.

15. The light shielding sheet of claim 1, wherein the metal substrate is made of one selected from the group consisting of iron, copper, aluminum, silver and gold.

16. The light shielding sheet of claim 1, wherein the light extinction film has a chromaticity coordinate, in which $0<L^*<1.4$, $|a^*|<1$, and $-2.5<b^*<0$.

* * * * *